United States Patent [19]

Melocik et al.

[11] Patent Number: 4,555,651
[45] Date of Patent: Nov. 26, 1985

[54] MOTOR SPEED CONTROL APPARATUS

[75] Inventors: Grant C. Melocik, Chardon; William Pickering, University Heights, both of Ohio

[73] Assignee: Towmotor Corporation, Mentor, Ohio

[21] Appl. No.: 638,850

[22] Filed: Aug. 8, 1984

Related U.S. Application Data

[63] Continuation-in-part of Ser. No. 455,775, Jan. 5, 1983.

[51] Int. Cl.⁴ .............................................. H02P 5/06
[52] U.S. Cl. .................................... 318/341; 318/139; 318/345 E; 318/439
[58] Field of Search ............... 318/138, 139, 384, 385, 318/397, 398, 301–328, 341, 345 E, 439

[56] References Cited

U.S. PATENT DOCUMENTS

| 4,090,115 | 5/1978 | Franz, Jr. ................. 318/345 E X |
| 4,282,466 | 8/1981 | Matty ............................. 318/332 X |
| 4,366,420 | 12/1982 | Omae et al. ........................ 318/338 |
| 4,381,479 | 4/1983 | Wesling et al. ..................... 318/317 |
| 4,386,301 | 5/1983 | Neki et al. ...................... 318/341 X |
| 4,423,362 | 12/1983 | Konrad et al. ...................... 318/139 |
| 4,427,930 | 1/1984 | Berman et al. ................. 318/326 X |
| 4,441,061 | 4/1984 | Yoshida et al. ................ 318/341 X |

FOREIGN PATENT DOCUMENTS

| 0044773 | 1/1982 | European Pat. Off. . |
| 2325533 | 4/1977 | France . |
| WO82/00738 | 3/1982 | PCT Int'l Appl. . |

Primary Examiner—William M. Shoop, Jr.
Assistant Examiner—Shik Luen Paul Ip
Attorney, Agent, or Firm—Stephen L. Noe

[57] ABSTRACT

Apparatus is provided for controlling increases in the speed of a motor, including a transducer coupled to an accelerator pedal, that generates digital numbers representing motor speed commands, a data processor for receiving the speed commands, generating motor speed limit signals in response to the digital numbers and delivering the limit signals to a controllable circuit for supplying power to the motor. The limit signals are delivered in response to time and the magnitude of the speed commands.

6 Claims, 10 Drawing Figures

MOTOR SPEED CONTROL APPARATUS

CROSS REFERENCE TO RELATED APPLICATIONS

This application is a Continuation-in-Part of application Ser. No. 455,775, filed Jan. 5, 1983, by Grant C. Melocik et al.

DESCRIPTION

1. Technical Field

This invention relates to a speed control apparatus and, more particularly, to an apparatus for controlling increases and decreases in motor speed.

2. Background Art

A wide variety of systems utilize a motor to move or drive a device. For example, an electric vehicle has one or more drive wheels which are driven or rotated by one or more electrical motors. A control circuit is employed to control the supply of power to the motor to increase or decrease its speed when an increased or decreased vehicle speed is commanded as a result of depressing or releasing an accelerator pedal.

Under some conditions, the motor speed may be substantially and rapidly increased though this may be undesirable for proper operation of the device. For example, in a device such as the electric vehicle, the vehicle operator may fully depress the accelerator pedal from a fully released position to accelerate the vehicle from zero speed to full speed. Or, for example, with the accelerator pedal being partially depressed at a quarter-speed position, the operator may accelerate the vehicle to three-quarters speed by depressing the pedal further. Quick acceleration is not always desirable, since this can produce a "jerky" motion, which may cause damage to, or undesirable shifting of, any loads being carried by the vehicle such as a plurality of heavy packages on a fork lift truck.

In one prior system, disclosed in U.S. Pat. No. 3,551,773, by Dannettell et al., issued Dec. 29, 1970, the vehicle acceleration or rate of increase in the speed of the drive motor is limited, but only for a short predetermined time after initial energization of the drive motor. That is, after the accelerator pedal is depressed from a fully released or zero speed position to a command speed position, the control circuit initially energizes the drive motor and then limits increases in the motor speed towards the command speed, but only for the predetermined time. Thereafter, i.e., subsequent to initial energization and the predetermined time, as the accelerator pedal is slightly released and depressed between various speed positions greater than zero, there is no limitation on acceleration. Thus, one problem is that, for the majority of the time that the vehicle is in motion, acceleration is not limited or controlled.

Furthermore, the prior system essentially encompasses out-dated, linear or analog design concepts. Thus, this system is not as reliable, cost-effective, fast and space-saving as it might be if it encompassed digital and integrated circuit technology. Moreover, the prior system is not software programmable; therefore, the acceleration limitation cannot be easily changed or tailored to, for example, different sized vehicles or other drive systems where acceleration should be limited.

The present invention is directed to overcoming one or more of the problems as set forth above.

DISCLOSURE OF THE INVENTION

In one aspect of the present invention, an apparatus for controlling the rate of acceleration of an electric motor of a vehicle having a power source is provided. Generating means produce a predetermined plurality of motor speed command signals, each signal having a different digital value. Processor means receive the motor speed command signals, produce and store a digital accelerator ramp signal, produce and deliver predetermined successive motor speed limit signals each for a first predetermined period of time in response to the received motor speed command signal having a digital value greater than the stored accelerator ramp digital signal, and increment the accelerator ramp signal to the next successive value after each successive motor speed limit signal is delivered for the predetermined period of time. Controllable supplying means receive the motor speed limit signals and controllably couple the power source to the motor in response to the received motor speed limit signals.

The instant invention advantageously limits the rate of acceleration of the electric motor over a first predetermined speed range and is free from limiting acceleration over a different predetermined speed range.

BRIEF DESCRIPTION OF THE DRAWINGS

For a better understanding of the present invention reference may be had to the accompanying drawings in which:

FIGS. 2A–E illustrates pulse trains associated with the one embodiment;

BEST MODE FOR CARRYING OUT THE INVENTION

Figure 1:
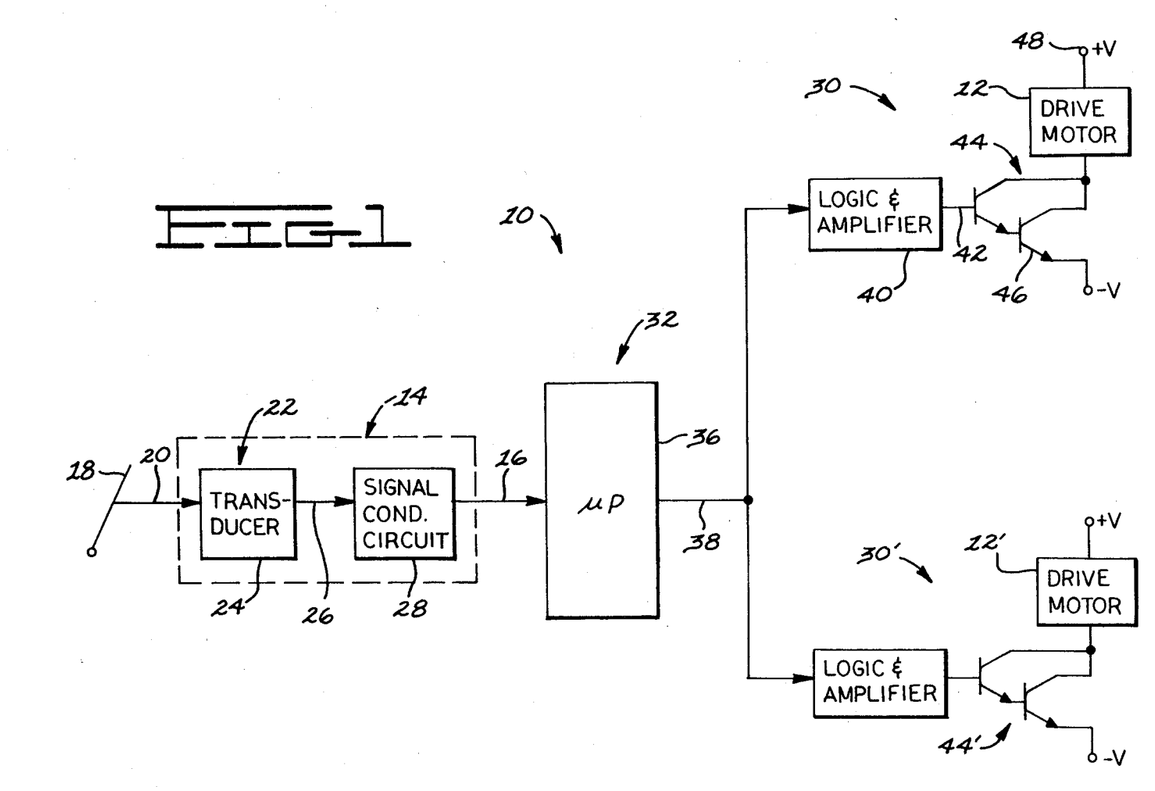
FIG. 1 is a block diagram of one embodiment of the present speed control apparatus.

FIG. 1 shows a motor speed control apparatus 10 for controlling acceleration or increases in the speed of an electric drive motor 12, as well as deceleration or decreases in the speed of the motor 12. The control circuit 10 includes a means 14 for generating a plurality of different motor speed command signals, on a respective plurality of output lines 16, each in response to a different motor speed command. For example, the signals produced by the generating means 14 on the line 16 can be 4-bit digital signals or numbers ranging from 0000 to 1111. Each digital number in the range 0000–1111 represents a different command motor speed for the motor 12, so that, for example, number 0000 represents zero motor speed, number 1000 represents half motor speed and number 1111 represents full or maximum motor speed. The progression from 0000 to 1111 may be linear or non-linear as desired. A non-linear progression could provide increased resolution in the low speed ranges for increased operator convenience and control. The range of binary coded decimal digital numbers from 0000 to 1111 is used only for convenient illustration and could, of course, be any suitably coded digital representation having a number of bits consistent with the desired precision, for example, a gray code.

The generating means 14 can be coupled to an accelerator pedal 18 via a linkage 20. The generating means 14 includes a means 22, such as a transducer 24, for converting position information of the accelerator pedal 18 being received from the linkage 20 to associated digital numbers in the range 0000–1111. The transducer 24 delivers the numbers via lines 26 to a signal conditioning circuit 28 which produces the conditioned numbers on the output lines 16.

In response to the accelerator pedal 18 being fully released or not depressed, the generating means 14 delivers the digital number 0000 on the lines 16. In response to the accelerator pedal 18 being fully depressed, the generating means 14 delivers the digital number 1111 on the lines 16. In response to the plurality of positions of the accelerator pedal 18 between the fully released and fully depressed positions, the generating means 14 delivers, on the lines 16, digital numbers between 0000 and 1111 representing motor speed commands between zero speed and full speed. Thus, for example, if the accelerator pedal 18 is fully depressed from the fully released position, the digital number on the lines 16 will increment from 0000 to 1111.

The control circuit 10 includes a controllable means 30 for supplying power to the motor 12 and a processor means 32 for receiving the command signals, controlling the supplying means 30, and limiting the rate of increase in the speed of the motor 12 in response to each of the received signals having a greater magnitude. The processor means 32 includes for example a microprocessor 36, for sequentially generating a plurality of different motor speed limit signals and delivering the signals via a line 38 to the supplying means 30. As will be described below, the limit signals on the line 38 can be a plurality of pulse trains, each having a duty factor corresponding to one of the digital numbers on the lines 16. Thus, in the present example, since there are sixteen digital numbers in the range 0000–1111, there are sixteen different pulse trains that can be produced on the line 38.

The limit signals are generated by the processor means 32 in response to time and the magnitude of the command signals. The number of different limit signals generated is variable in response to the magnitude of the command signals. For example, if the accelerator pedal 18 is moved from the fully released position to the half speed position, the magnitude of the command signal delivered to the processor means 32 will increment from the digital number 0000 to the number 1000. In response, the processor means 32 will sequentially generate nine different limit signals in response to the magnitude of the change of the received command signals. The limit signals will be delivered to the supplying means 30 in response to time, or sequentially at preselected time intervals.

The relationship between the accelerator pedal 18 position, the motor speed command signals, and the duty factors of the pulse trains delivered to the supplying means 30 are detailed in Table 1. The accelerator pedal 18 position is shown, for exemplary purposes, as a percentage of pedal movement with zero indicating a fully released or zero speed command position and 100% indicating a fully depressed or maximum speed command position. The motor speed command signals are shown as digital numbers and the pulse train duty factors as the percentage of pulse "on-time" to pulse "off-time". For continuity and ease of explanation, the relationships shown in Table 1 are representative of a substantially linear system, although, as discussed above, a non-linear system could be readily implemented wherein the relationship between the accelerator pedal 18 position and the pulse train duty factor is tailored for a specific application.

The supplying means 30 includes a logic and amplifier circuit 40 which receives the pulses of the pulse trains being delivered on the line 38 and delivers respective amplified pulse trains to an output line 42. An on-off power switching means 44 for switching power to the motor 12 is connected to the line 42 and has a power transistor 46 in series with the motor 12. A power source 48, such as a battery $V_{BAT}$, supplies power to the motor 12. In response to the pulse trains on the line 42, the on-off power switching means 44 will turn on and off to couple and decouple power from $+V_{BAT}$ through the motor 12 and the power transistor 46 to $-V_{BAT}$.

The present invention can also be applied to independently and simultaneously control additional motors which are similar to the motor 12. Thus, FIG. 1 shows a controllable supplying means 30' and motor 12' that respond to the pulses of the pulse trains on the line 38 in the same manner as the controllable supplying means 30 and the motor 12.

Figure 2A:
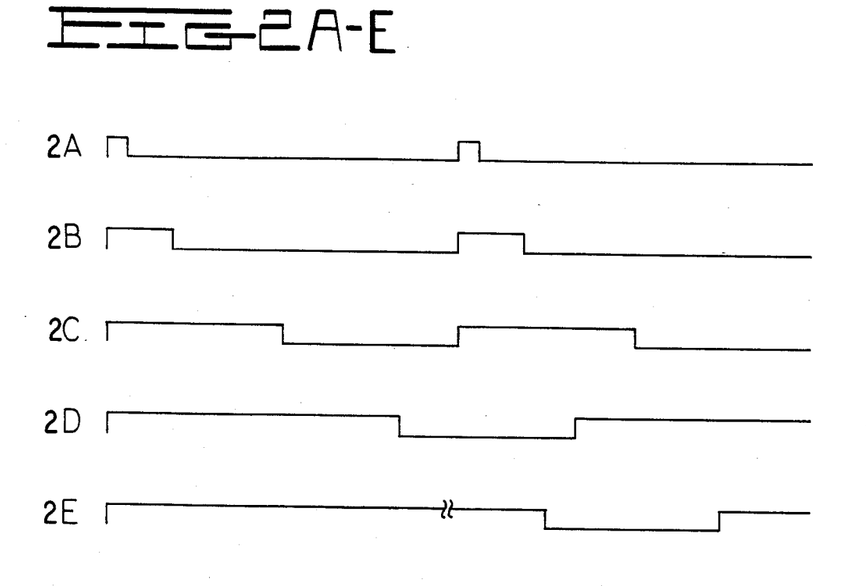

FIG. 2 shows examples of limit signals produced by the processor means 32 on the line 38. Five pulse trains A–E are shown corresponding to five selected motor speed commands. FIG. 2A through FIG. 2C show the pulse trains corresponding to a motor speed command range from minimum speed greater than zero to half speed. FIG. 2C through 2E show the pulse trains corresponding to a motor speed command range from half speed to maximum or full speed.

The pulse trains shown have substantially constant frequencies and variable duty factors in response to a first preselected range of motor speed command signals, and variable frequencies and duty factors in response to a second preselected range of speed command signals. Reference may be made to Table 1, in addition to the following description, for a better understanding of FIG. 2.

FIG. 2A illustrates the pulse train for the minimum speed condition having a duty factor of, for example, 6.25%. This pulse train is of constant, minimum frequency and duty factor. FIG. 2B illustrates the pulse train for a motor speed between minimum speed and half speed. This pulse train is of constant, but increased duty factor, for example, 18.75%, relative to the duty factor shown in FIG. 2A. Since the duty factor is increased by increasing the "on-time" of the pulses while correspondingly decreasing the "off-time", the pulse train frequencies are unchanged.

FIG. 2C illustrates the pulse train for the half speed condition. The frequency of this pulse train remains constant and unchanged from the frequency shown in FIG. 2B; however, the duty factor is increased to the 50% level, i.e., the "on-time" of the pulses equals the "off-time".

FIG. 2D illustrates the pulse train corresponding to a motor speed between half speed and full speed. In this pulse train, the "on-time" of the pulses is increased over the "on-time" of the previously described pulses, while holding the "off-time" constant and the same as shown in FIG. 2C. This constitutes a decrease in frequency from pulse train of FIG. 2C, but motor speed is increased due to the longer "on-time" or higher duty factor, for example, 62.5%. FIG. 2E illustrates the pulse train corresponding to a full controlled speed condition. The "on-time" of the pulses in FIG. 2E is increased over the "on-time" of the pulses in FIG. 2D while holding the "off-time" constant and the same as shown in FIGS. 2C and 2D. This constitutes a decrease in frequency over the latter, but motor speed is again increased due to the longer "on-time" or still higher duty factor of the pulse train, for example, 93.75%. Note that the "on-time" of the pulses in FIG. 2E is foreshortened to permit display on the drawing and, in this example, would be fifteen times the pulse "on-time" of FIG. 2C.

As FIG. 2 graphically illustrates, the constant frequency variable duty factor pulse trains, shown in FIGS. 2A–2C, limit motor speed by limiting the power supplied to the motor 12 from zero to one half of the maximum power available. The variable frequency and duty factor pulse trains, shown in FIGS. 2D–2E, limit the power supplied to the motor 12 from one half to approximately 94% of the maximum available, in the embodiment shown. The application of maximum power to the motor 12 can be accomplished with a bypass contact in parallel with the power switching means 44, as is conventional in the art and is not shown in the Figs.

As will be more fully described in connection with the flowchart of FIG. 3, under software control, the microprocessor 36 responds to each digital number received on the lines 16 by outputting a corresponding pulse train on the line 38. Thus, for example, if the digital number 1000 for half-speed command is on the lines 16, the microprocessor 36 outputs on the line 38 the half-speed pulse train as shown in FIG. 2C.

The limitation on increases in motor speed or acceleration occurs in the following manner. In response to a change in the digital number on the lines 16 from a number representing a first motor speed command to a number representing a second higher motor speed command, the microprocessor 36 does not immediately deliver to the line 38 the motor speed limit signal corresponding to that higher speed command. Rather, the microprocessor 36 sequentially generates and delivers each of the limit signals from the signal corresponding to the first motor speed command to the limit signal corresponding to the higher speed command. Each such limit signal or pulse train thus step-wise causes an increase in motor speed until the limit signal being delivered to the supplying means 30 by the microprocessor 36 corresponds to the motor speed command signal being received by the microprocessor 36. Each incremental limit signal or pulse train output is maintained for a preselected period of time to cause a gradual transition from the first speed command to the higher speed command.

By delivering the limit signals as a function of time, a ramped acceleration rate is provided by the apparatus 10. For example, the "ramp time" can be two seconds, which means that it will take two seconds to ramp up or to increase the speed of the motor 12 from zero speed to full speed by incrementally delivering the limit signals to the supplying means 30. Thus, also for example, it will take one second to ramp up from zero speed to half speed or from one-quarter speed to three-quarters speed, and one-half second to ramp up from half speed to three quarter speed or from one-quarter speed to half speed, etc. Other ramp times may be utilized to produce for one second or three second acceleration rates.

Whereas the microprocessor 36 will limit the rate of increase in motor speed, as described above, the rate of decrease in the speed of the motor is free from limitation in response to each command signal having a smaller magnitude. When a digital number on the lines 16, representing a first motor speed command, is changed to a digital number representing a second, lower motor speed command, the microprocessor 36, under the software control to be described, does not "ramp down" or sequentially deliver the limit signals or pulse trains on the line 38 representing decreasing motor speeds. To the contrary, the microprocessor 36 immediately changes the limit signal or pulse train on the line 38 from the pulse train representing the first motor speed command to the limit signal representing the second lower speed command. Thus, there is no delay in delivering the reduced motor speed limit signal.

Figure 4:
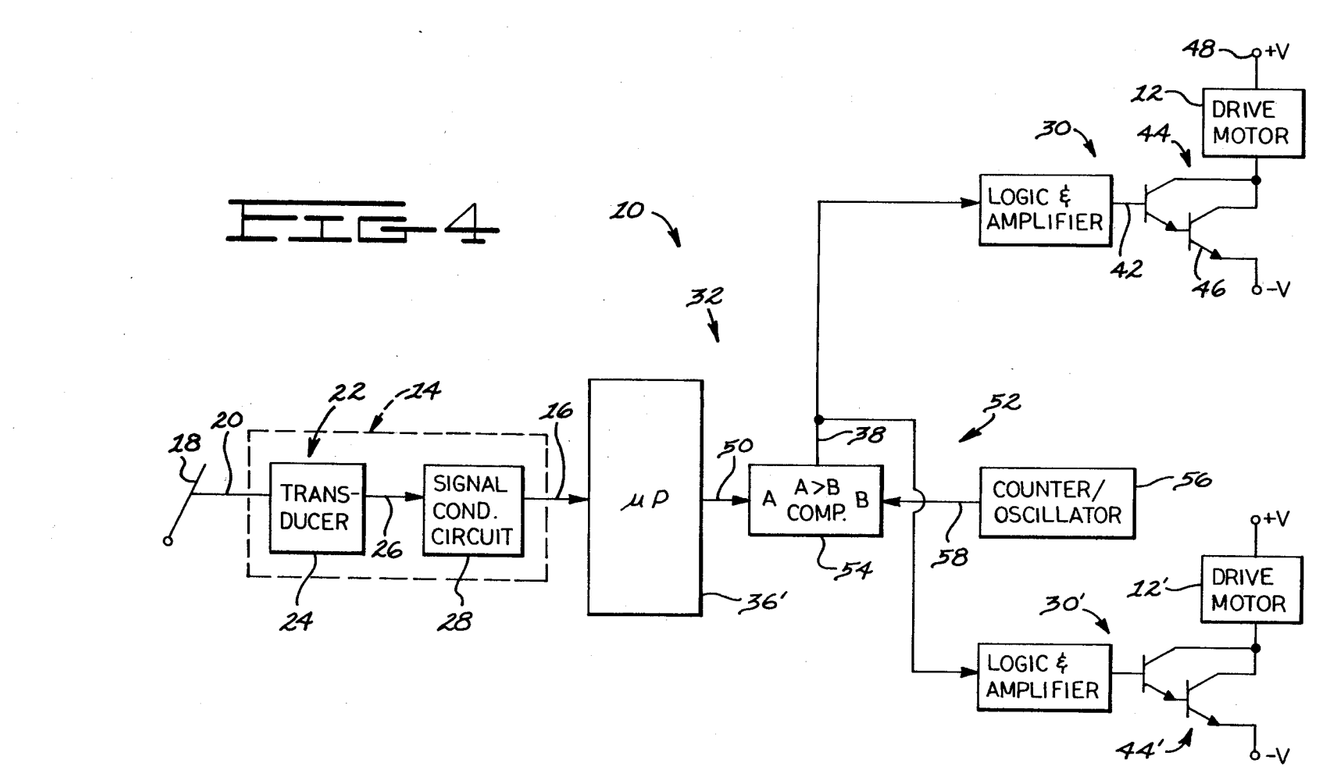
FIG. 4 shows a block diagram of an alternative embodiment of the present invention.

FIG. 4 illustrates another embodiment of the apparatus 10 having like components as the embodiment shown in FIG. 1, as indicated by the like reference numerals. Thus, for example, the apparatus 10 of FIG. 4 has the means 14 for generating digital numbers, the controllable supplying means 30 and the power switching means 44 of the means 30. The other controllable supplying means 30' is illustrated in FIG. 4 to show that this embodiment can likewise be applied to one or more drive motors 12, 12'.

The apparatus 10 of FIG. 4 also has the processor means 32 for controlling the supplying means 30 to limit increases in the speed of the motors 12, 12' in response to the digital numbers on the line 16. However, whereas the processor means 32 of FIG. 1 has the microprocessor 36 which is software programmed to output the pulse train trains limit signals of FIG. 2 onto the line 38, the processor means 32 of FIG. 4 has a microprocessor 36' which is software programmed to output 4-bit digital number limit signals onto the lines 50. A digital number-to-pulse-train converter means 52 receives the limit signals on the lines 50, modifies the signals, forms respective pulse trains and delivers the pulse trains to the supplying means 30,30' via the line 38.

The converter means 52 includes a comparator 54 connected to a counter/oscillator 56 by lines 58. The comparator 54 has pins "A" receiving the 4-bit numbers on the lines 50, pins "B" receiving 4-bit numbers from the counter/oscillator 56 via the lines 58 and an output "A greater than B" coupled to the line 38. The counter-/oscillator 56 free runs at a fixed frequency to sequentially deliver the numbers from 0000 to 1111 inclusive to the lines 58. After the counter/oscillator 56 reaches 1111, it restarts at 0000 and the counting cycle repeats.

As an example of the operation of the processor means 32 of FIG. 4, assume that in response to a digital number on the line 16, the microprocessor 36' outputs on the line 50 the number 1000. The number 1000 is thus delivered to the comparator 54 at its pins "A". As the counter/oscillator 56 counts through one cycle from 0000 through 0111, the output of the comparator 54 on the line 38 is in a first preselected state since "A greater than B" is true. In response, the supplying means 30 and 30' turns on the power switching means 44 and 44'. Then, as the counter/oscillator 56 continues to count from 1000 to 1111, the condition "A greater than B" is false and the output of the comparator 54 on the line 38 is in a second preselected state. In response, the supplying means 30 and 30' turns off the switching means 44 and 44'. When the counter/oscillator 56 restarts at 0000, the output pulse on the line 38 returns to the first state.

Consequently, the motors 12 and 12' are controllably powered in response to the duty factor or proportion of "on-time" to "off-time" of the pulse trains delivered to the supplying means 30,30'.

If an increased motor speed is required, the number on the line 50 can be, for example, 1100. Then, for counts in a cycle of the counter/oscillator 56 less than 1100, the output of the comparator 54 on the line 38 is in the first preselected state and for counts equal to or greater than 1100 the output of the comparator 54 on the line 38 is in the second preselected state. In response, the supplying means 30 and 30' turns off the power switching means 44 and 44' for a shorter duration, resulting in a higher duty factor of the pulse trains, more power being supplied to the motors 12 and 12' and a higher motor speed. It can be seen, therefore, that the pulses of the pulse trains on the line 38 remain at a constant frequency, corresponding to the fixed frequency of the counter/oscillator 56, but vary in duty factor according to the relationship between the digital numbers received at A and B.

Moreover, the processor means 32 of FIG. 4 also limits increases in motor speed in a manner similar to the processor means 32 of FIG. 1. In response to the digital number on the line 16 being changed to a digital number representing a higher motor speed command, the microprocessor 36' periodically and sequentially increments the digital number delivered to the line 50. This results in a sequential change of the pulse trains produced on the line 38 until the pulse trains being delivered to the supplying means 30,30' represent the digital number on the line 16.

Figure 3:
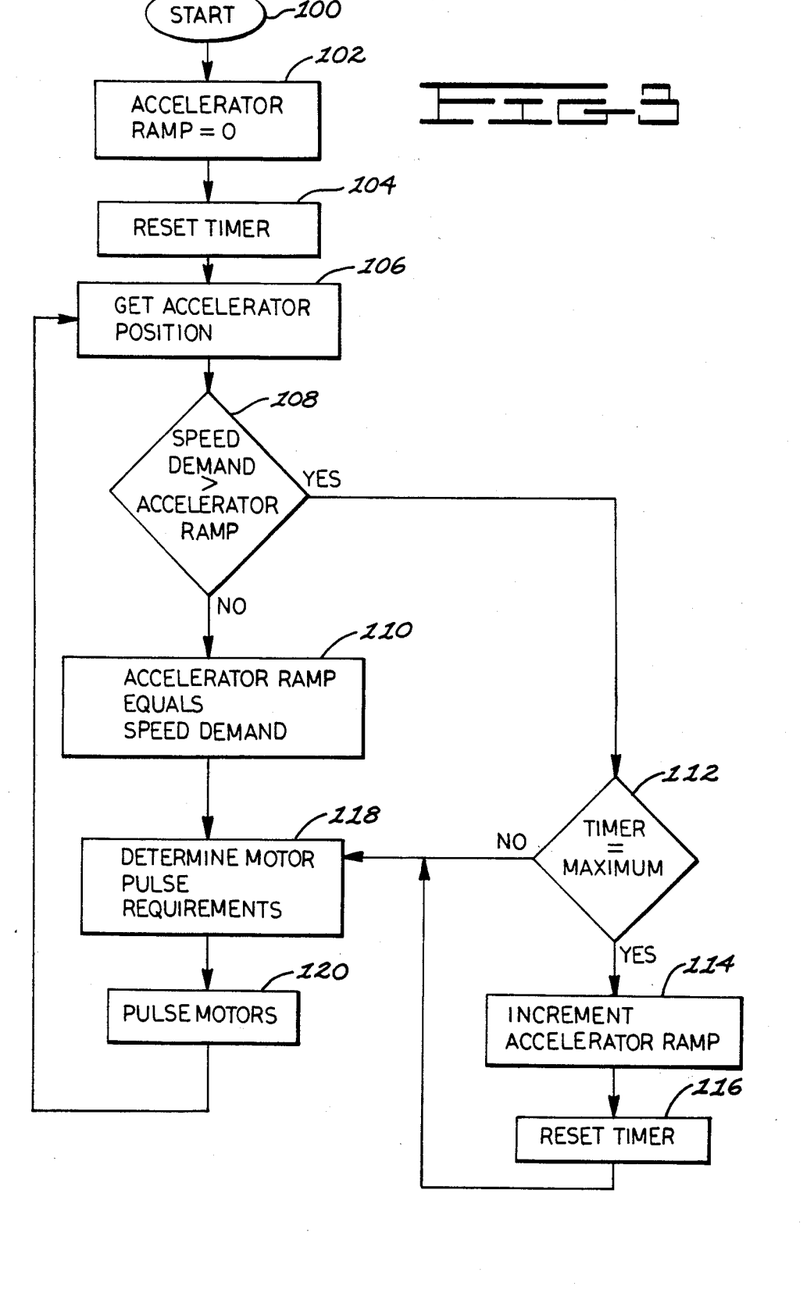
FIG. 3 is a flowchart of software used with the present invention.

FIG. 3 is a flowchart of a computer program suitable for controlling the speed control apparatus 10. Only the software routines required to implement one embodiment of the present invention are described herein. Sufficient detail is presented to allow one skilled in computer programming to write the required program to implement the flowchart for any common microprocessor, for example, the microprocessor produced by MOSTEK Corporation of Carrollton, Tex. and designated by the part number 3870. Upon beginning the flowchart at the block 100 labeled START, program control progresses through the following sequence:

In the block 102, a variable called "accelerator ramp" is set equal to zero. "Accelerator ramp", for the purpose of this discussion, will store the digital number representing the actual motor speed limit signal to be output to the drive motor 12. Next, in the block 104, a timer is reset or re-initialized and begins to increment towards a maximum value at a preselected rate.

In the block 106, the desired speed information is received from the means 14 in response to the position of the accelerator pedal 18. The digital number from the means 14 is then compared, in the block 108, with the digital number stored in the "accelerator ramp" variable. If the digital number from the means 14 is less than or equal to the "accelerator ramp" digital number the "accelerator ramp" is set equal, in the block 110, to the means 14 number and control is transferred to the block 118.

If the digital number from the means 14 is greater than the "accelerator ramp" digital number, meaning that increasing speed is being demanded, program control transfers to the block 112 where the status of the timer is checked. If the timer has not yet timed out, i.e., has not been incremented to its maximum value, control immediately transfers to the block 118, described below. If the timer has timed out, the "accelerator ramp" digital number is incremented by one, in block 114, from its present value. If the number is already at a value corresponding to the maximum motor command speed, it is left unchanged. Next, in the block 116, the timer is reset to its minimum value and control is transferred to the block 118.

Thus, under each possible circumstance, program control ultimately progresses to the block 118 wherein the variable "accelerator ramp" contains the digital number representing the motor speed limit signal to be output to the motor 12. In the block 120, the limit signal may be output directly as a digital number to pulse the motor 12 according to the embodiment of FIG. 4, or the digital number may be converted, either according to a look-up table stored in memory or by direct calculation, to a controlled duty factor pulse train according to the embodiment of FIG. 1. For example, if the "accelerator ramp" digital number is 1000, indicating a half motor speed requirement, a 50% duty factor pulse train will be output by the block 120. Each digital number between 0000 and 1111 will result in a corresponding pulse train duty factor being output by the block 120. Control next passes from the block 120 back to the block 106 and the program is repeated from that point according to the foregoing explanation.

Figure 6:
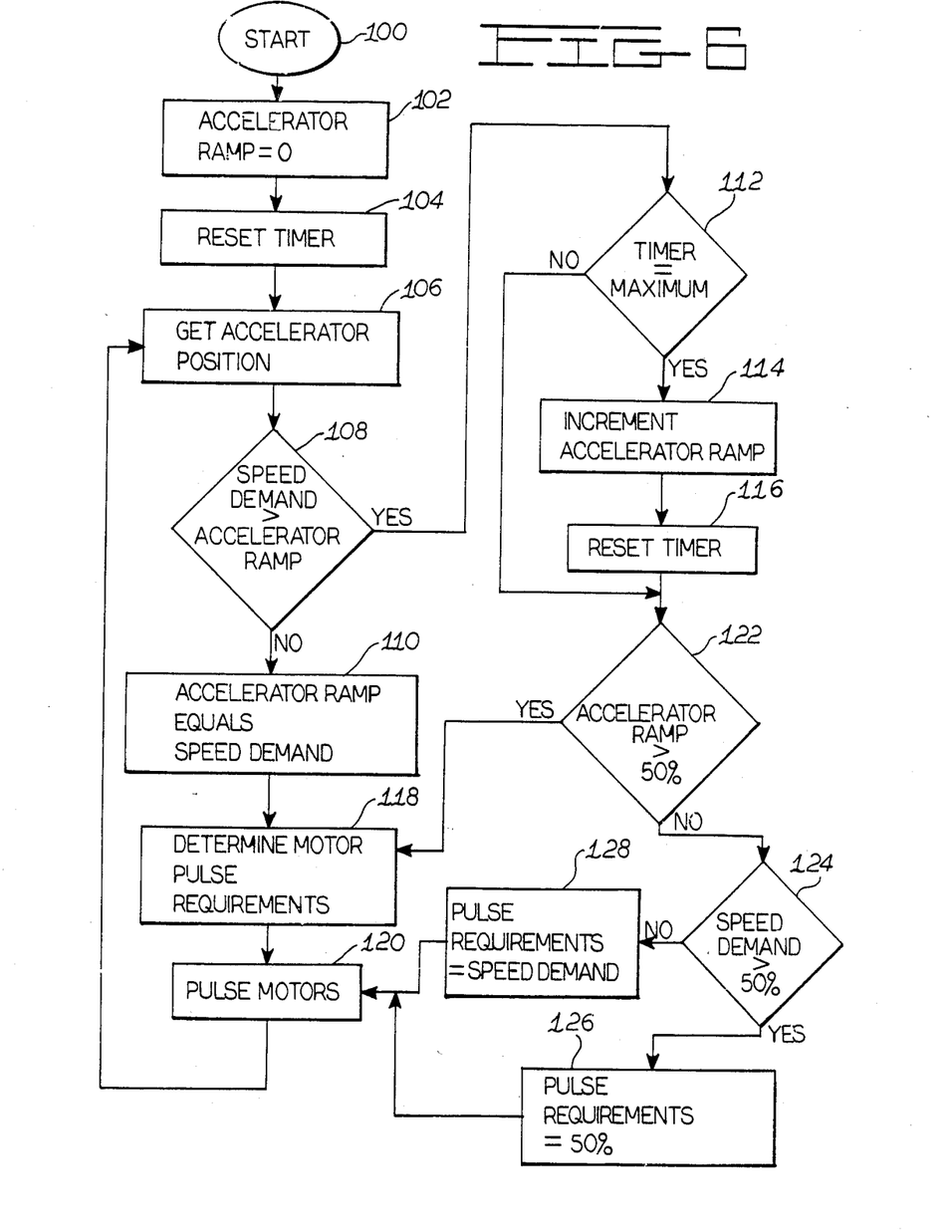

Under particular circumstances it is desirable to provide ramped acceleration control over only a portion of the full speed range of a motor. For example, the construction of a particular vehicle can be such that optimum performance results when acceleration over a low speed portion of the vehicle speed range is not ramp limited, while acceleration over a high speed portion of the vehicle speed range is limited as described above. FIG. 6 is a flowchart of a computer program suitable for implementing such a modified embodiment of the present invention. Note that the flowchart of FIG. 6 incorporates all of the steps of the flowchart of FIG. 3, plus the following additional steps.

In the flowchart of FIG. 3, program control always ultimately progresses to the block 118, where the motor pulse requirements are determined by the variable "acceleration ramp." In the flowchart of FIG. 6, the "acceleration ramp" digital number is tested in the block 122. If "acceleration ramp" is greater than 50% of maximum, program control progresses to the block 118 and continues as described above with reference to FIG. 3.

However, if "acceleration ramp" is less than or equal to 50% of maximum, the speed demand digital number received from the generating means 14 is checked in the block 124 to determine if it is greater than 50% of maximum. If so, control progresses to the block 126 where the motor speed limit signal corresponding to 50% motor pulsing is determined and delivered to the block 120. If the speed demand digital number is less than or equal to 50% of maximum, the motor speed limit signal corresponding to the received speed demand signal is determined in the block 128 and delivered to the block 120. Therefore, in the modified embodiment the "accelerator ramp" variable does not necessarily represent the motor speed limit signal that is actually delivered to the motor 12.

In either case, the appropriate pulse train is output to the motor, and control passes back to the block 106, restarting the process.

Figure 5:
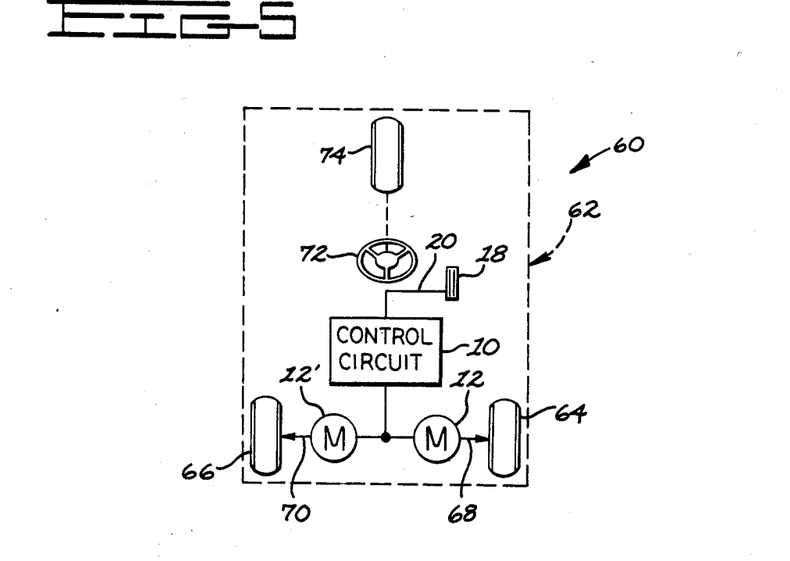
FIG. 5 is a schematized top view of a vehicle incorporating the present invention; and, FIG. 6 is a flowchart of software used with a modified embodiment of the present invention.

FIG. 5 shows the apparatus 10 for controlling the supply of electrical power to the drive motors 12 and 12'. As one example, the apparatus 10, drive motor 12 and drive motor 12' are employed as part of an overall control system 60 for an electric vehicle 62 having a left drive wheel 64 and a right drive wheel 66. The motor 12 rotates the wheel 64 through a shaft 68 and the motor 12' rotates the wheel 66 through a shaft 70. Also shown, the accelerator pedal 18 provides input data to the control circuit 10 via the linkage 20. To complete the control system 60, the vehicle 62 is shown as also having a steering wheel 72 and a steerable wheel 74 that is turned by the steering wheel 72 to steer the vehicle 62.

TABLE 1

| Accelerator Pedal Position (% of Maximum) | Motor Speed Control Signals | Pulse Train Duty Factors (%) |
| --- | --- | --- |
| 0.00 | 0000 | 0.00 |
| 6.67 | 0001 | 6.25 |
| 13.33 | 0010 | 12.50 |
| 20.00 | 0011 | 18.75 |
| 26.67 | 0100 | 25.00 |
| 33.33 | 0101 | 31.25 |
| 40.00 | 0110 | 37.50 |
| 46.67 | 0111 | 43.75 |
| 53.33 | 1000 | 50.00 |
| 60.00 | 1001 | 56.25 |
| 66.67 | 1010 | 62.50 |
| 73.33 | 1011 | 68.75 |
| 80.00 | 1101 | 75.00 |
| 86.67 | 1101 | 81.25 |
| 93.33 | 1110 | 87.50 |
| 100.00 | 1111 | 93.75 |

INDUSTRIAL APPLICABILITY

As previously indicated, the vehicle 62 can be, for example, an electric fork lift truck which is used for handling loads.

In operation, assume that the accelerator pedal 18 is fully released so that the vehicle 62 is not in motion. At this time, the digital motor speed command signal on the lines 16 represents zero motor speed command or, will be, for example, 0000. In response to this signal, the processor means 32 delivers a motor speed limit signal free from pulses to the supplying means 30 so that no power is coupled to the motors 12 and 12'.

Then, in response to the accelerator pedal 18 being moved to the fully depressed or maximum speed position from the zero speed position, the digital number on the lines 16 changes from 0000 to 1111. However, the processor means 32 does not abruptly produce the limit signal on the line 38 corresponding to maximum or full controlled speed. Rather, the processor means 32 sequentially delivers the limit signals or pulse trains corresponding to the range of sixteen steps from 0000-1111 to gradually increase the vehicle speed to maximum controlled speed over a preselected ramp time. In the example previously given of the ramp time of two seconds, it will take two seconds to change or ramp up to the maximum controlled speed condition from the zero speed condition. The vehicle 62 thus will gradually increase in speed.

As another example, and in a similar manner, in response to the accelerator pedal 18 being moved from the half speed position to the full speed position, the digital number on the lines 16, for example, changes from 1000 to 1111. Because of the two second total ramp time, it now takes one second to ramp up from the half speed to the full speed condition.

Once a maximum controlled motor speed condition is attained, a bypass contact may be closed in parallel with the power switching means 44, as is conventional in the art.

As discussed above, the processor means 32 increases the speed of the motors 12 and 12' at a controlled and limited rate in response to each motor speed command signal having a greater magnitude. Additionally, the processor means 32 reduces the speed of the motors 12 and 12' to a commanded lower speed at a rate free from limitation in response to each motor speed command signal having a smaller magnitude. Thus, for example, assume that the accelerator pedal 18 is fully depressed to the full speed position, resulting in the number 1111 being present on the lines 16 and the limit signal corresponding to maximum controlled motor speed being delivered to the line 38. In response to the accelerator pedal 18 being moved to the half speed position, the digital number on the lines 16 changes from 1111 to 1000. The processor means 32 responds to the smaller motor speed command signal by substantially immediately delivering the motor speed limit signal on the line 38 corresponding to this half speed command. In other words, the processor means 32 does not ramp down to a lower motor speed limit signal, but substantially immediately produces the limit signal for that lower speed. Consequently, the speed of the vehicle 62 is abruptly reduced.

In the modified embodiment, ramped acceleration control is provided only over a preselected range of motor speeds, for example, only over a high speed portion of the motor speed range. Assume that ramped acceleration control is desired over the motor speed range above 50% of maximum speed, and that no ramped control is desired up to and including 50% motor speed.

In response to the accelerator pedal 18 being moved to any position from the zero speed position up to and including the half speed position, the processor means 32 responds to the received command signal by substantially immediately delivering the respective motor speed limit signal to the controllable supplying means 30. This motor speed limit signal is continuously delivered for a period of time equal to the predetermined ramp time that would be required to attain the command speed condition from the starting condition if ramped acceleration control were being utilized. For example, in response to the accelerator pedal 18 being moved from the zero speed position to the one quarter speed position, the digital number on the lines 16 changes from 0000 to 0100, and the processor means 32 substantially immediately delivers the motor speed limit signal corresponding to the received one quarter speed command signal to the controllable supplying means 30 via the line 38. This one motor speed limit signal is delivered continuously for a period of time equal to the total time that the motor speed limit signals from zero speed to one quarter speed would be delivered if ramped acceleration control were being utilized. The vehicle 62 responsively accelerates to the commanded speed at a rate controlled by the vehicle dynamics and external conditions.

In response to the accelerator pedal 18 being moved to any position from the half speed position through the full speed position, the processor means 32 responds to the received command signal by sequentially delivering the motor speed limit signals to the controllable supplying means 30 over a predetermined period of time, just as described above with reference to the first embodiment. For example, in response to the accelerator pedal 18 being moved from the half speed position to the three quarter speed position, the digital number on the lines 16 changes from 1000 to 1101. The processor means 32 sequentially delivers the motor speed limit signals corresponding to each of the steps between the received command signals to the controllable supplying means 30 via the line 38. Each motor speed limit signal is delivered for a predetermined period of time to gradually increase the vehicle speed over the predetermined ramp time. The vehicle 62 responsively accelerates to the commanded speed at a controlled ramp rate.

In response to the accelerator pedal 18 being moved from a position between the zero speed position and the half speed position to a position between the half speed position and the full speed position, the processor means 32 responds to the received command signal by substantially immediately delivering the motor speed limit signal corresponding to half motor speed to the controllable supplying means 30. This motor speed limit signal is continuously delivered for a period of time equal to the predetermined ramp time that would be required to attain the half speed condition from the starting condition if ramped acceleration control were being utilized. Following this period of time, the processor means 32 sequentially delivers the motor speed limit signals corresponding to each of the steps between half speed and the command speed to the controllable supplying means 30 over a predetermined period of time, just as described above with reference to the first embodiment.

For example, in response to the accelerator pedal 18 being moved from the zero speed position to the full speed position, the digital number on the lines 16 changes from 0000 to 1111. The processor means 32 substantially immediately delivers the motor speed limit signal corresponding to the half speed condition to the controllable supplying means 30 via the line 38 for a period of time equal to one half of the total ramp time from zero to full speed. The vehicle 62 responsively accelerates to half speed at a rate controlled by the vehicle dynamics and external conditions. The processor means 32 next sequentially delivers the motor speed limit signals corresponding to each of the steps between half speed and full speed to the controllable supplying means 30. Each motor speed limit signal is delivered for a predetermined period of time to gradually increase the vehicle speed from half speed to full speed over the predetermined ramp time. The vehicle 62 responsively accelerates quickly to half speed and at a controlled ramp rate from half speed to full speed.

As another example, in response to the accelerator pedal 18 being moved from the one quarter speed position to the three quarter speed position, the digital number on the lines 16 changes from 0100 to 1101. The processor means 32 responds to the received command signal by substantially immediately delivering the motor speed limit signal corresponding to half motor speed to the controllable supplying means 30. This motor speed limit signal is continuously delivered for a period of time equal to the total time that the motor speed limit signals from one quarter speed to one half speed would be delivered if ramped acceleration control were being utilized. The processor means 32 next sequentially delivers the motor speed limit signals corresponding to each of the steps between half speed and three quarter speed to the controllable supplying means 30 over a predetermined period of time, just as described above with reference to the first embodiment.

Under each set of conditions, deceleration of the vehicle occurs without ramped control, just as described above with reference to the first embodiment.

In summary, the present invention limits the rate of increase in the speed of a motor 12,12′ in response to each occurrence of an increase in speed being commanded, over at least a predetermined range of motor speeds. Thus, such a limitation is not constrained to a predetermined time interval after initial energization of the motor 12,12′. Yet, the present invention also, without rate limitation, reduces the speed of a motor 12,12′ to a commanded reduced speed. Furthermore, being software programmable, the present invention can be tailored to or designed for different size and types of motors 12,12′ and vehicles 62.

Other aspects, objects and advantages of this invention can be obtained from a study of the drawings, the disclosure and the appended claims.

We claim:

1. Apppparatus (10) for controlling the rate of acceleraton of an electric motor (12) of a vehicle, said vehicle having a power source (48), comprising:

generating means (14) for producing a predetermined plurality of motor speed command signals, each signal having an incrementally different digital value;

processor means (32) for receiving each of said motor speed command signals, producing an accelerator ramp signal in response to receiving said motor speed command signals, said accelerator ramp signal having a predetermined digital value, storing said produced accelerator ramp signal within said processor means (32), producing predetermined successive motor speed limit signals each for a first predetermined period of time in response to said received motor speed command signal having a digital value geater than said stored accelerator ramp signal digital value and to said stored accelerator ramp signal digital value being in a first predetermined range of values, and incrementing said accelerator ramp signal to the next successive value in response to each successive motor speed limit signal being produced for said first predetermined period of time; and controllable supplying means (30) for receiving said motor speed limit signals and controllably coupling said power source (48) to said motor (12) in response to said received motor speed limit signals.

2. Apparatus (10), as set forth in claim 1, wherein said processor means (32) produces only one motor speed limit signal for a second predetermined period of time greater than said first predetermined period of time, in response to said received motor speed command signal having a digital value greater than said stored accelerator camp signal digital value and to said stored accelerator ramp signal digital value being in a second predetermined range of values exclusive of said first predetermined range of values, said stored accelerator ramp signal value being periodically incremented to the next successive value in response to said one motor speed limit signal being produced for said first predetermined period of time.

3. Apparatus, as set forth in claim 2, wherein the total number of different values of said first and second predetermined ranges of values is equal to the number of said motor speed command signals.

4. Apparatus (10), as set forth in claim 2, wherein said one produced motor speed limit signal has a value determined by said received motor speed command signal in response to said motor speed command signal digital value being in said second predetermined range of values.

5. Apparatus, as set forth in claim 2, wherein said first predetermined period of time is fixed, and said second predetermined period of time is varied in response to the difference between said received motor speed command signal digital value and said stored accelerator ramp signal digital value.

6. Apparatus, as set forth in claim 2, wherein the absolute number of different motor speed limit signals produced in response to said received motor speed command signal having a digital value greater than said stored accelerator ramp signal digital value is equal to the arithmetic difference between said received motor command signal digital value and said stored accelerator ramp signal digital value.

* * * * *